United States Patent [19]
Dick

[11] 3,721,856
[45] March 20, 1973

[54] SWITCHING SYSTEM FOR PLURAL PROJECTION OF TRACES ON SCREEN OF SINGLE-BEAM CATHODE-RAY TUBE

[75] Inventor: Rudolf Dick, Eningen, Germany
[73] Assignee: Wandel u. Golterman, Reutlingen, Germany
[22] Filed: Dec. 14, 1970
[21] Appl. No.: 97,751

[30] Foreign Application Priority Data
Dec. 15, 1969 Germany..................P 19 62 773.7

[52] U.S. Cl.....................315/25, 179/15 A, 315/18
[51] Int. Cl..............................................H01j 29/70
[58] Field of Search..........315/18, 19, 20, 21, 22, 23, 315/24, 25; 179/15 A, 15 BL; 307/269

[56] References Cited
UNITED STATES PATENTS
2,547,289   4/1951   Smart....................................315/22
3,432,850   3/1969   Chamberlin........................179/15 A Primary Examiner—Carl D. Quarforth
Assistant Examiner—J. M. Potenza
Attorney—Karl F. Ross

[57] ABSTRACT

Two or more signals to be visually displayed on the screen of a single-beam cathode-ray tube are alternately fed to the vertical deflection electrodes of that tube for periods of different duration to generate traces distinguishable from one another by their brightness and/or the length of their strokes. In the first instance, they are interrupted for different fractions of a sweep cycle. In the second case, each trade is triggered on for a whole number of such cycles.

10 Claims, 8 Drawing Figures

Rudolf Dick
INVENTOR.

Rudolf Dick
INVENTOR.

BY

Attorney

SWITCHING SYSTEM FOR PLURAL PROJECTION OF TRACES ON SCREEN OF SINGLE-BEAM CATHODE-RAY TUBE

My present invention relates to an electronic display system for the visualization of two or more signals recurring with the same periodicity, e.g., the output voltages of a test pad and a reference pad simultaneously energized in a predetermined rhythm by a variable-frequency oscillator.

Conventional visualizers of this type utilize an oscilloscope in the form of a multibeam cathode-ray tube whose several beams are independently deflected by respective input signals to display corresponding traces on different portions of the oscilloscope screen, or on the same screen portion but with differences in brightness or possibly in color.

In a simpler and therefore less expensive system using a single-beam cathode-ray tube, two traces due to different input signals can be simultaneously displayed by alternately connecting one of the two deflection controls of the tube, referred to hereinafter for convenience as the vertical-deflection control, to the two signal sources. In this case, however, the resulting traces are of similar intensity and cannot be readily distinguished by the observer without temporary suppression of one or the other signal.

It is, therefore, the general object of my invention to provide a simplified visualizing system, using a one-beam cathode-ray tube, which characteristically distinguishes two or more traces from one another by the nature of their appearance on the oscilloscope screen.

This object is realized, pursuant to the present invention, by the provision of a plurality of input circuits which carry respective signals to be displayed on a common oscilloscope screen, the system including switchover means for connecting the several input circuits to the vertical-deflection control in a predetermined sequence and for periods differing among one another sufficiently to reproduce these signals on the screen as characteristically different traces.

If $T_x$ is the length of a sweep cycle, i.e., the period of a control voltage (usually of sawtooth shape) applied to the horizontal-deflection control of the oscilloscope, the "on" period for each trace may be expressed by $kT_x$ where $k$, different for each signal, advantageously is either an integer or a small fraction. In the first instance, each trace may remain on the screen for a full cycle or for a succession of several cycles, the latter type of projection resulting in the appearance of a more intense trace as long as $T_o$ is shorter than the time of physiological and/or photoelectric image retention. If $k<<1$, the trace is interrupted so as to appear as a series of discontinuous strokes alternating with the strokes of another trace concurrently generated, the stroke length being significantly different in the two traces to facilitate their visual distinction in the continuous presence of the CRT beam.

With such fractional display periods, the switchover means may comprise a free-running multivibrator of asymmetrical construction which may be synchronized with the horizontal sweep voltage at the beginning of each cycle, as by being connected through a binary frequency divider to a pulse generator serving as a timer for the oscilloscope sweep and for the source of input signals. Such synchronization, however, is not essential since in the absence thereof the strokes will merely wander along the traces without altering the configurations of the traces themselves. In fact, an unsynchronized and a synchronized multivibrator may be used to distinguish between as many as four different signals by projecting a pair of traces with fixed strokes and a pair of traces with migrating strokes during alternate cycles.

The invention will be described in detail hereinafter with reference to the accompanying drawing in which.

Figure 1:
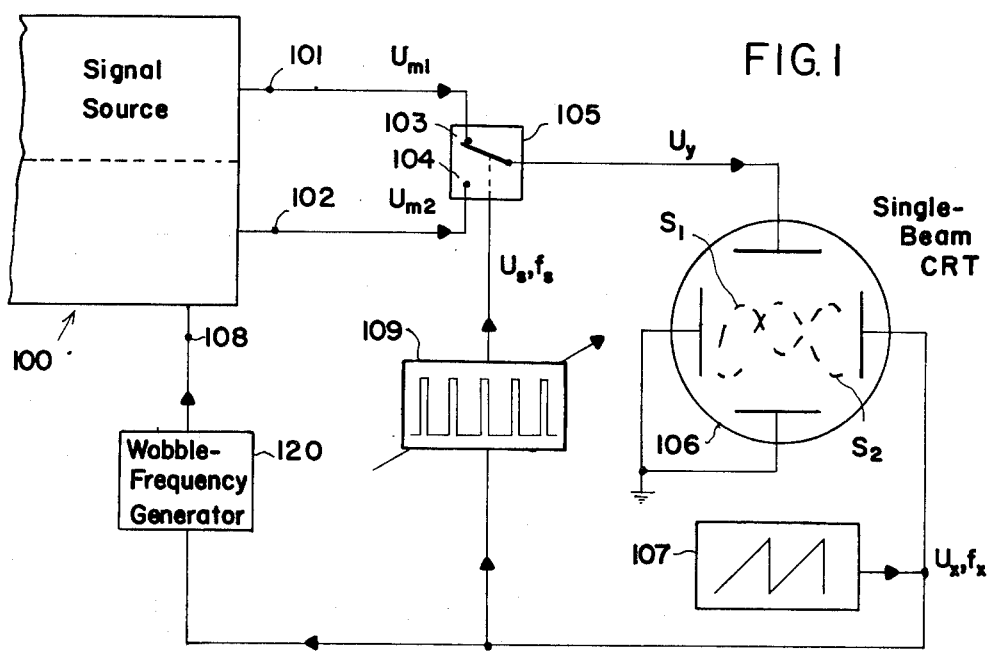
FIG. 1 is a block diagram of an electronic visualizing system representing a first embodiment.

The system of FIG. 1 includes a signal source 100, illustrated only schematically, which may comprise a test circuit for the simultaneous evaluation of different impedance networks or pads upon application thereto of a continuously varying frequency within a predetermined band from a wobble-frequency generator 120 working into an input terminal 108 thereof. Two output terminals 101, 102 of circuit 100 carry respective voltages $Um_1$, $Um_2$ emanating from the pads so energized; one of these voltages may be a calibrating signal from a reference pad while the other one is a measuring signal from a pad to be tested. Such testing circuits have been described, for example, in commonly owned U.S. Pat. No. 3,461,385.

Wobble-frequency generator 120 is under the control of a sawtooth-voltage generator 107 with an output voltage $U_x$ and a repetition frequency $f_x$. Voltage $U_x$ is applied to a sweep circuit, represented as a pair of horizontal-deflection electrodes, of a cathode-ray tube having an oscilloscope screen 106. The vertical-deflection electrodes of that tube receive an input voltage $U_y$ from an electronic switch 105 alternately completing a connection 103 or 104 to terminal 101 or 102 for impressing either the signal $Um_1$ or the signal $Um_2$ upon these deflecting electrodes. Switch 105 responds to the output voltage $U_s$ of an astable or free-running multivibrator 109 with an unsymmetrical output voltage $U_s$ and a repetition frequency $f_s$; multivibrator 109 has a control lead connected to the output of generator 107 for periodic resynchronization with the oscilloscope sweep by the usual flyback signal at the end of each sweep cycle.

Figure 2:
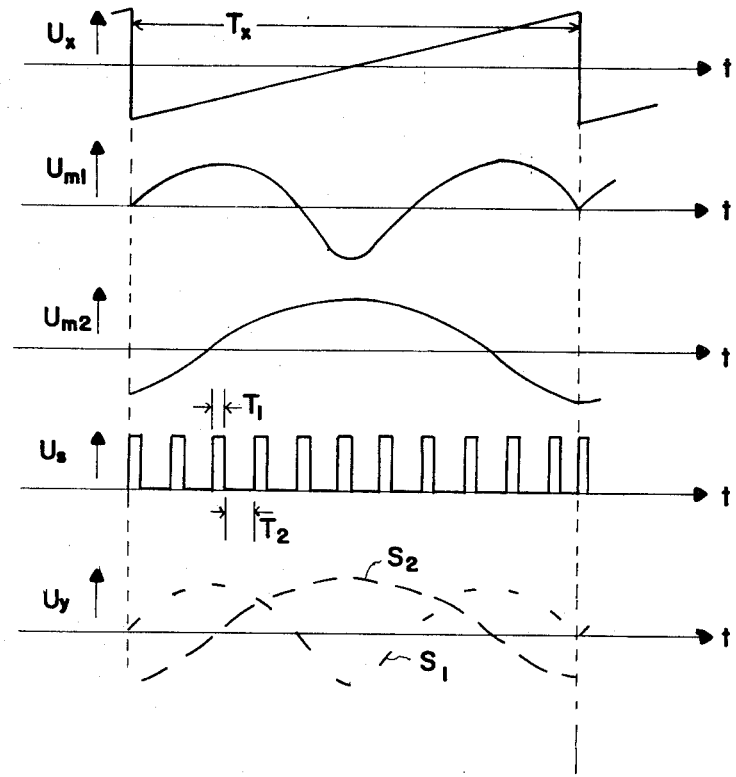
FIG. 2 is a set of graphs relating to the operation of the embodiment of FIG. 1.

Input signals $Um_1$ and $Um_2$, sawtooth voltage $U_x$, multivibrator output $U_s$ and deflecting voltage $U_y$ are shown plotted against time $t$ in the several graphs of FIG. 2 from which it appears that the "on" period $T_1$ for the first signal $Um_1$ (with switch 105 in its upper position to complete the circuit 103) is substantially shorter than the corresponding period $T_2$ for signal $Um_2$ (with switch 105 in its lower position to complete the circuit 104), the specific ratio $T_2:T_1$ being shown as 2:1. Thus, there appears on oscilloscope screen 106 a discontinuous trace $S_1$, representing the signal $Um_1$, whose relatively short strokes coincide with the periods $T_1$ and alternate with longer strokes of a trace $S_2$ coinciding with periods $T_2$ and representing the signal $Um_2$. The two traces are therefore readily distinguishable to an observer viewing the screen, as will be apparent also from FIG. 1. It will be apparent that, in order to produce the closely interleaved traces $S_1$ and $S_2$ of FIG. 2, the beam of the oscilloscope must remain turned on over the entire sweep cycle.

As already explained, multivibrator 109 may be disconnected from the output of timer 107 with no other effect than a progressive displacement of the strokes along traces $S_1$ and $S_2$, at a rate depending upon the deviation of its repetition period $T_1 + T_2$ from an exact fraction of the length of sweep cycle $T_x$, if (as will frequently be the case) this repetition period is not equal to such a fraction.

As indicated schematically in FIG. 1, the time constant of multivibrator 109 may be manually adjustable to vary the ratio $T_2:T_1$, with or without a change in the overall repetition period $T_1 + T_2$ of this multivibrator.

Figure 3:
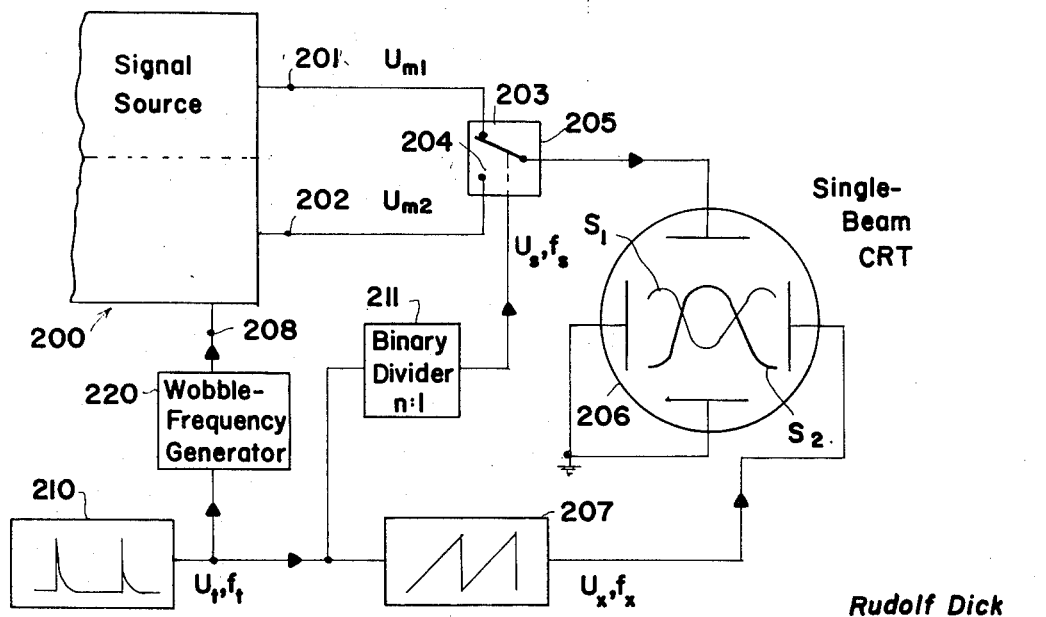
FIG. 3 is a diagram similar to FIG. 1, representing a second embodiment.

In FIG. 3, elements corresponding to those of FIG. 1 have been designated by analogous reference numerals with substitution of a "2" for the "1" in the position of the hundreds digit. These elements, therefore, need not be described again except for pointing out that sawtooth-voltage generator 207 is here driven by a primary timing circuit in the form of a generator 210 of short pulses $U_t$ with a cadence or recurrence frequency $f_t = f_x$. A binary frequency divider 211, of step-down ratio $n:1$, is also driven by the output of pulse generator 210 (in parallel with wobble-frequency generator 220) and replaces the multivibrator 109 of FIG. 1 as a control unit for the rhythm of electronic switch 205.

Figure 4:
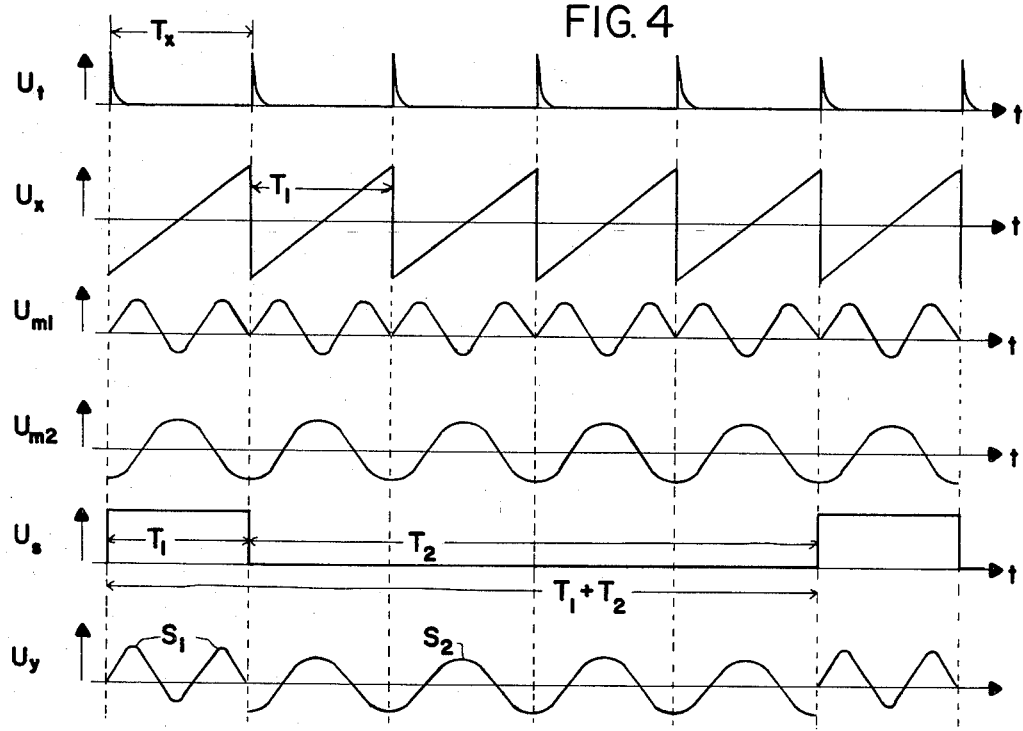
FIG. 4 is a set of graphs similar to FIG. 2, relating to the operation of the system of FIG. 3.

FIG. 4 shows, in addition to the parameters discussed in conjunction with FIG. 2, the output $U_t$ of pulse generator 210 here shown to have a pulse spacing $T_x$ equal to the period of residence $T_1$ of switch 205 in its upper position (with completion of circuit 203). Period $T_2$ (with completion of circuit 204 by switch 205) here lasts for four sweep cycles $T_x$, so that $n = 5$. The result is a greatly increased brightness of trace $S_2$ compared with trace $S_1$ on screen 206.

Figure 7:
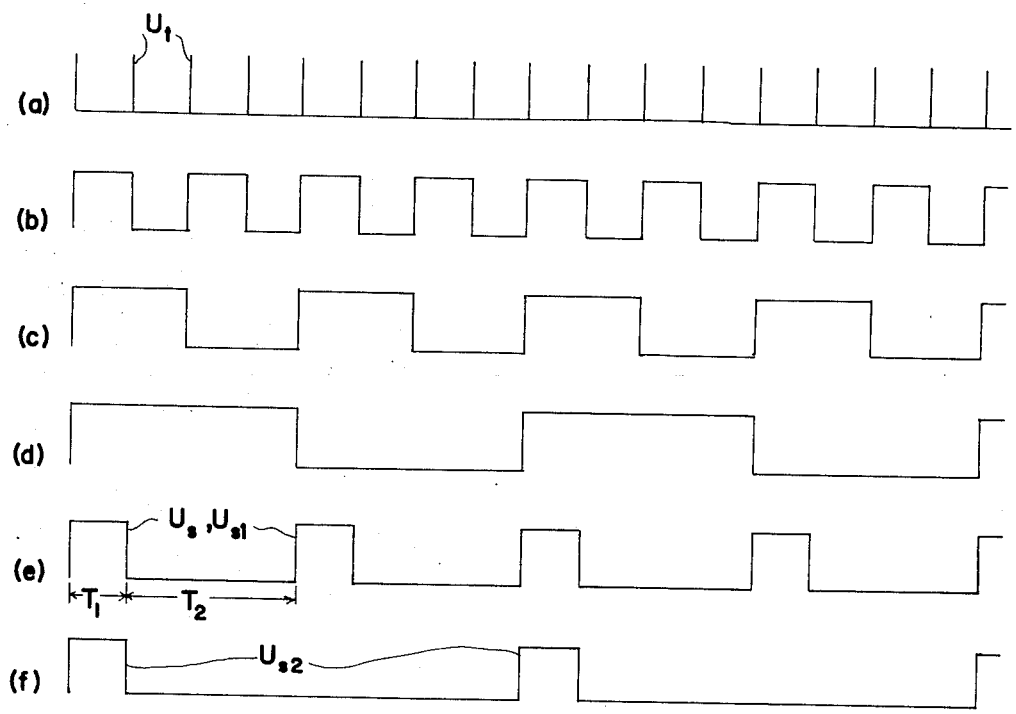
FIG. 7 is a set of graphs relevant to the operation of the systems of FIGS. 3, 5 and 6.
Figure 8:
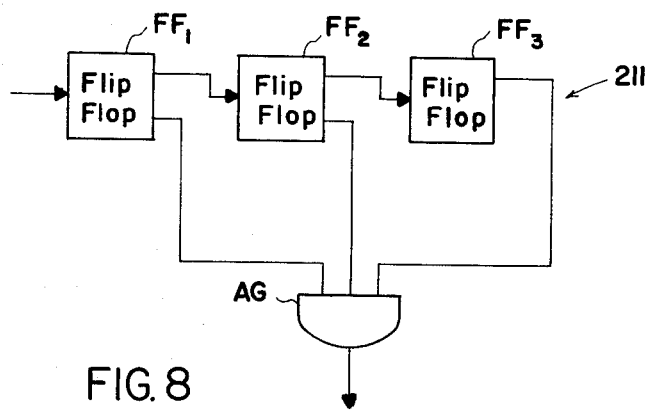
FIG. 8 is a more detailed showing of a frequency divider included in the three last-mentioned systems.

FIG. 7 illustrates, for a step-down ratio of 4:1 ($n = 4$), the operation of a binary frequency divider 211 constructed as illustrated in FIG. 8. This divider comprises three cascaded flip-flops $FF_1$, $FF_2$, $FF_3$ and an AND gate AG whose output, in response to the trigger pulses $U_t$ from generator 210 applied to the input of the first stage $FF_1$ and shown in graph (a) of FIG. 7, is a train of rectangular pulses $U_s$, graph (e), of a width $T_1$ and with a spacing $T_2$. Graphs (b), (c) and (d) show square waves issuing from the respective divider stages and entering the AND gate AG. Thus, the switching frequency $f_s$ is the reciprocal of the sum of periods $T_1$ and $T_2$.

Figure 5:
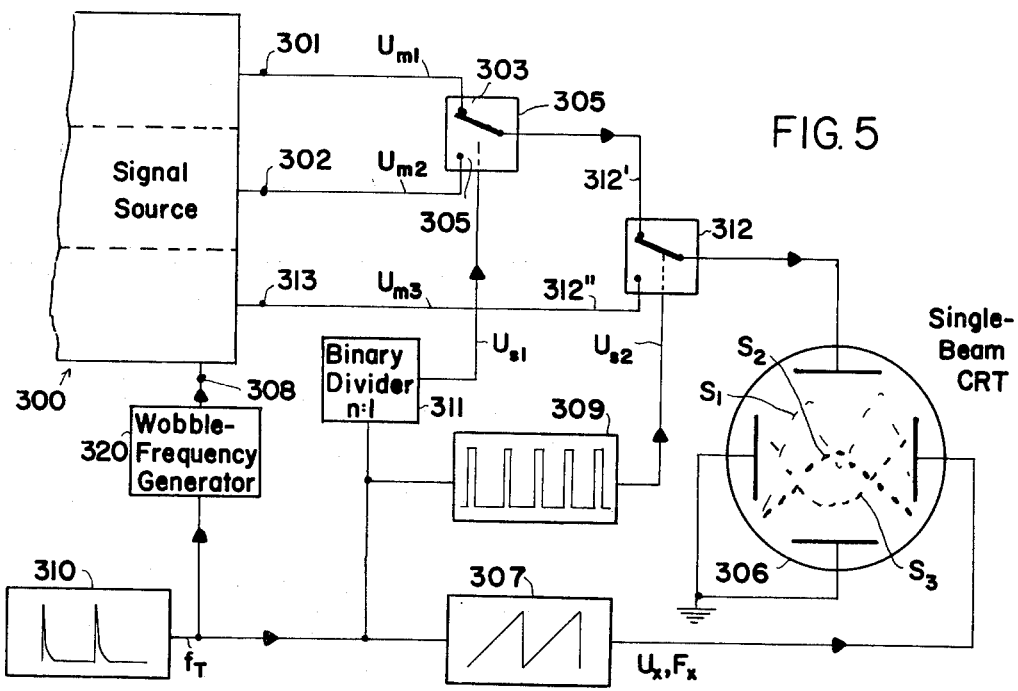
FIGS. 5 and 6 are two further block diagrams representing two additional embodiments.

FIG. 5 illustrates a system combining the features of FIGS. 1 and 3; elements previously described bear analogous reference numerals with a "3" in the position of the hundreds digit. In this embodiment, the switch 305 is cascaded with a similar electronic switch 312 having a first input lead 312', originating at switch 305, and a second input lead 312" extending from a third output terminal 313 of measuring circuit 300 which carries a third signal $Um_3$. Binary frequency divider 311 reverses the switch 305 in the rhythm of a pulse train $U_{s1}$, similar to that shown in FIG. 7 (e), whereas switch 312 is controlled by the output of a multivibrator 309 connected in parallel with frequency divider 311 and generating a train of pulses $U_{s2}$ similar to that shown at $U_s$ in FIG. 2. Thus, traces $S_1$ and $S_2$ on screen 306 differ in brightness, like the corresponding traces on screen 206 of FIG. 3, but are also discontinuous like the traces shown in FIGS. 1 and 2 except that their strokes are now horizontally coextensive and alternate with similar but longer strokes of a third trace $T_3$ generated in the lower position of switch 312 independently of the position of switch 305. With this system, accordingly, it is possible to distinguish visually between three different input signals whose traces are characterized by the length of their stroke and/or by their brightness.

Figure 6:
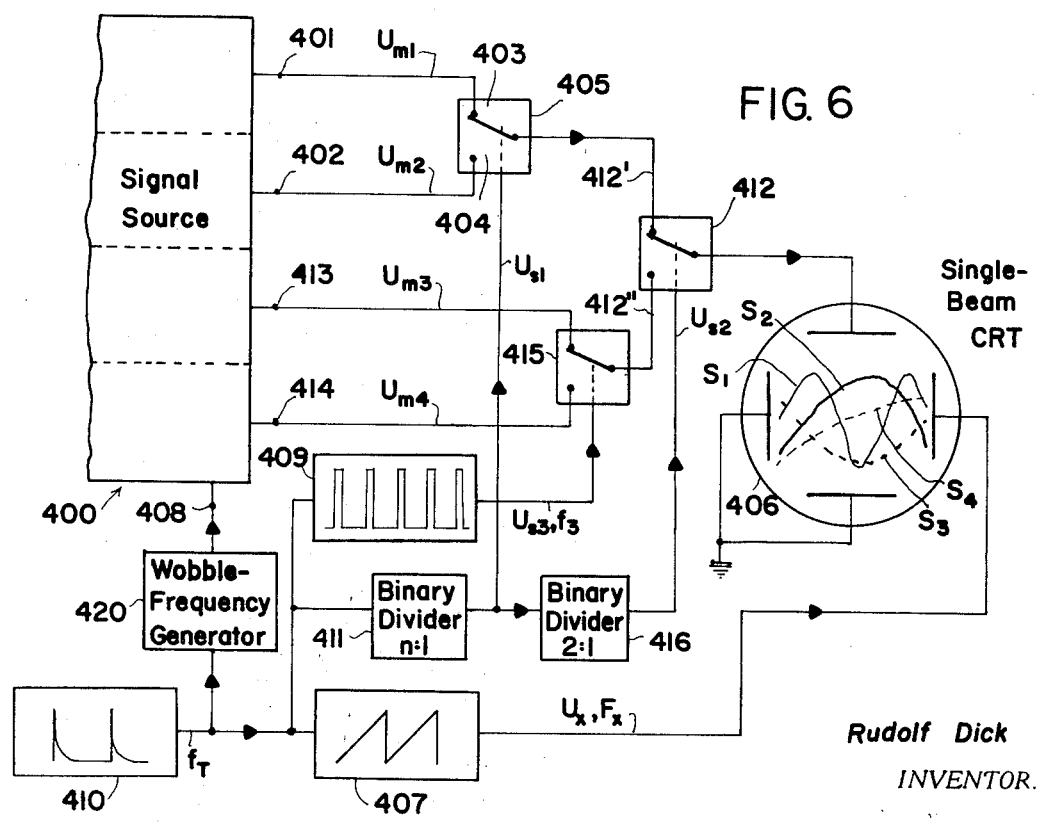

FIG. 6 illustrates a further extension of these principles to visualize four signals $Um_1$, $Um_2$, $Um_3$, $Um_4$ issuing from a source 400, the reference numerals used in this Figure differing from those earlier employed (for the designation of analogous components) only by the presence of a "4" in the position of the hundreds digit. This embodiment includes a third electronic switch 415 connected between outputs 413, 414 of measuring circuit 400 and the lower input 412" of switch 412. Switch 412 is periodically reversed by the output of a second binary frequency divider 416, of step-down ratio 2:1, which may comprise a single flip-flop alternately set and reset by the output voltage $U_{s1}$ of divider 411 to generate a train of switching pulses $U_{s2}$ as illustrated in graph (f) of FIG. 7. Switch 415 is controlled by the output $U_{s3}$ of multivibrator 409 whose repetition frequency $f_3$ corresponds to the frequency $f_s$ of FIG. 1.

Thus, with switch 412 remaining in its upper position for seven out of eight sweep cycles, traces $S_1$ and $S_2$ will come into existence for periods $T_1$, $T_2$ as described above with reference to graph (e) of FIG. 7; they will therefore appear on screen 406 as continuous curves of different brightness. By contrast, signals $Um_3$ and $Um_4$ give rise to discontinuous traces $S_3$ and $S_4$ with interleaved strokes as illustrated with reference to traces $S_1$ and $S_2$ in FIGS. 1 and 2, coming into existence during one cycle out of eight. Again, it is assumed that the sweep frequency $f_x$ is sufficiently rapid to create the impression of a permanent image by the phenomenon of visual persistence.

Although with switchover rates equal or subharmonically related to the sweep frequency, as described with reference to FIG. 4, a synchronization between the sweep cycle and the switching cycle is also not absolutely essential, such synchronization allows the switching to coincide with the flyback stroke of the beam and, therefore, to be relatively protracted without creating any objectionable hiatus in the traces.

Optimum brightness differences for visual discrimination between traces with the same degree of coherence can be realized with values of $n$ ranging between 5 and 8.

I claim:

1. A system for distinctively visualizing a plurality of different signals generated with the same periodicity, comprising:

an oscillator screen forming part of a single-beam cathode-ray tube provided with first and second deflecting means for the beam thereof;

timing means connected to a source of said different signals and to said first deflecting means for establishing a sweep cycle in the rhythm of signal recurrence;

a plurality of input circuits respectively energizable from said source with said different signals;

and switchover means connecting said input circuits to said second deflecting means in a predetermined sequence and for periods sufficiently different, in the continuous presence of said beam, to reproduce said signals on said screen as characteristically different traces.

2. A system as defined in claim 1 wherein said switchover means is coupled to said timing means for synchronizing said periods with said sweep cycle.

3. A system as defined in claim 2 wherein said timing means comprises a generator of periodic pulses.

4. A system as defined in claim 3 wherein said switchover means is operative to maintain a connection from each input circuit to said second deflecting means for a whole number of sweep cycles, said number being different for each input circuit.

5. A system as defined in claim 4 wherein said switchover means includes an electronic switch and a binary frequency divider inserted between said electronic switch and said generator.

6. A system as defined in claim 3 wherein said switchover means is operative to alternate between different input circuits during one sweep cycle.

7. A system as defined in claim 6 wherein said switchover means comprises an asymmetrical free-running multivibrator connected to said generator for periodic resynchronization by said pulse.

8. A system as defined in claim 7 wherein said multivibrator is provided with control means for varying its time constant.

9. A system as defined in claim 2 wherein the number of said input circuits is greater than two, said switchover means including a first and a second switch in cascade, said first switch being controlled by said timing means for alternately connecting two of said input circuits to said second deflecting means over periods equal to a whole number of sweep cycles, said number being different for each of said two of said input circuits, said second switch being controlled by said timing means to shift periodically from said two of said input circuits to at least one further input circuit for recurrent lengths of time different from said periods.

10. A system as defined in claim 9 wherein the number of said input circuits is four, said switchover means including a third switch ahead of said second switch and connectable by the latter to said second deflecting means during said recurrent lengths of time for alternating between a third and a fourth input circuit.

* * * * *